May 7, 1940.  C. LOVELACE  2,200,032
FOOD CUTTING AND PRESSING MACHINE
Filed Aug. 10, 1938  3 Sheets-Sheet 2
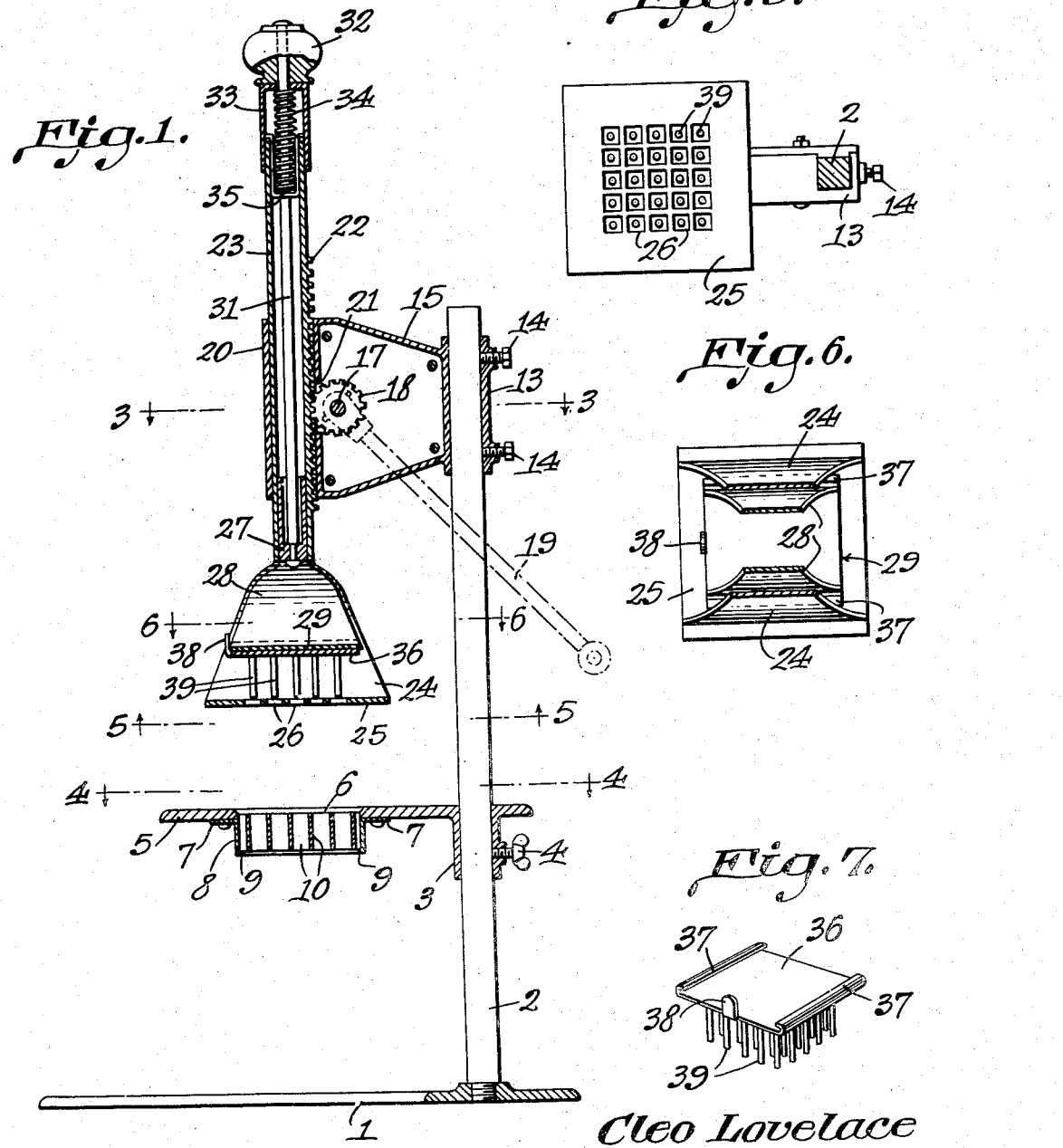
Cleo Lovelace
INVENTOR.
BY
ATTORNEYS.

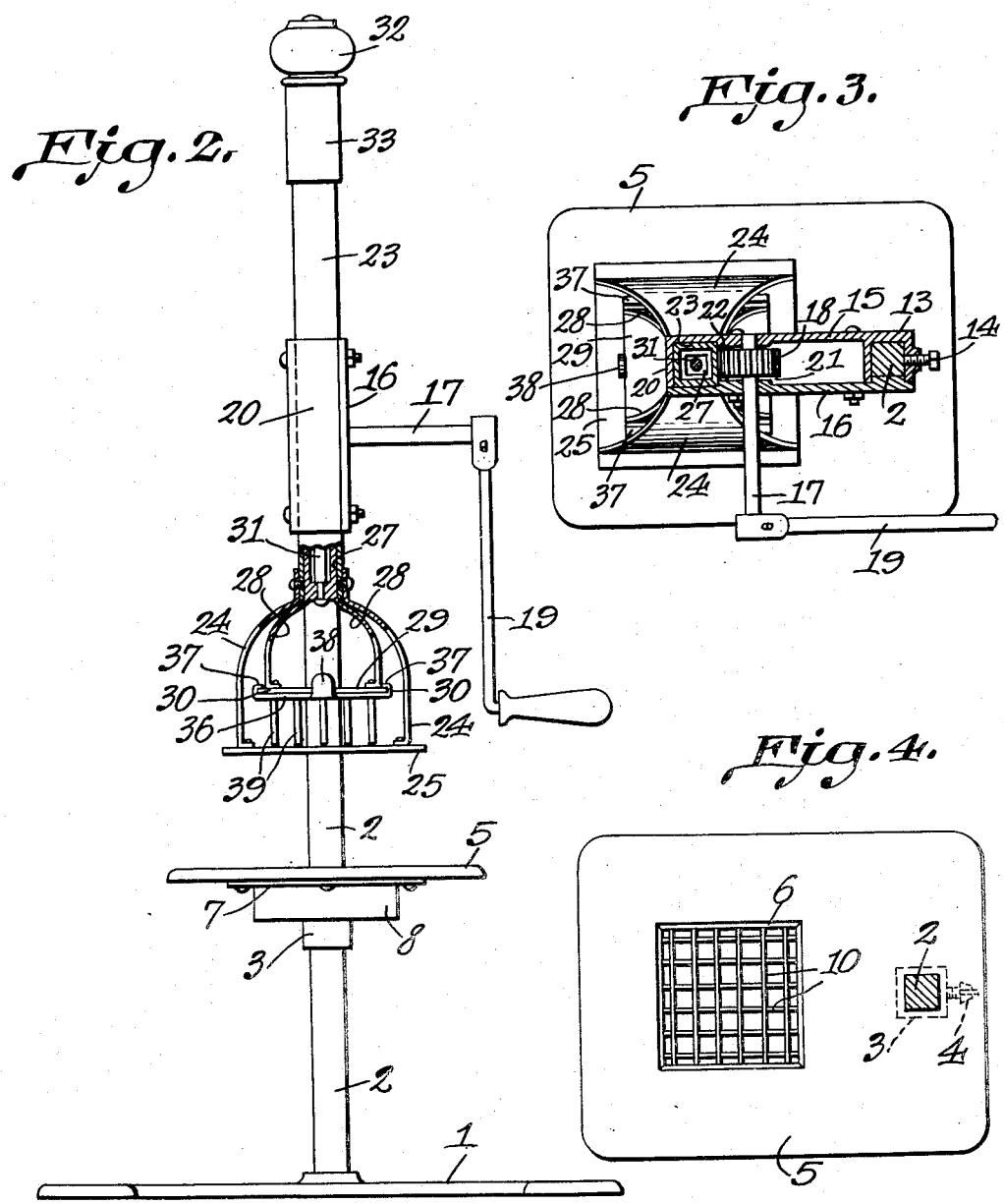

May 7, 1940.  C. LOVELACE  2,200,032

FOOD CUTTING AND PRESSING MACHINE

Filed Aug. 10, 1938  3 Sheets-Sheet 3

Cleo Lovelace
INVENTOR.

BY CASnowles

ATTORNEYS.

Patented May 7, 1940

2,200,032

UNITED STATES PATENT OFFICE 2,200,032

FOOD CUTTING AND PRESSING MACHINE

Cleo Lovelace, Aberdeen, Wash.

Application August 10, 1938, Serial No. 224,184

2 Claims. (Cl. 146—169)

This invention relates to a device for use in cutting fruits and vegetables and also for extracting juices from fruits, one of the objects being to provide a device of this character which is of simple construction, can be operated readily, and which has means associated therewith by which the foods being cut can be sliced, diced, or made of other desired shapes.

It is a further object to provide a device with a means for insuring removal of the cut pieces from the blades so that the device will be kept clean.

Another object is to provide a device in which the food engaging parts can be detachably mounted so that any desired interchange of parts can be effected to produce the desired result.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

In the accompanying drawings the preferred forms of the invention have been shown.

In said drawings:

Figure 1 is a vertical section through the device.

Figure 2 is a front elevation, a portion being broken away.

Figure 3 is a section on line 3—3 of Figure 1.

Figure 4 is a section on line 4—4 of Figure 1.

Figure 5 is a section on line 5—5 of Figure 1.

Figure 6 is a section on line 6—6 of Figure 1.

Figure 7 is a perspective view of the ejector.

Figure 9 is a perspective view of another kind of grid used for slicing vegetables or the like;

Figure 8:
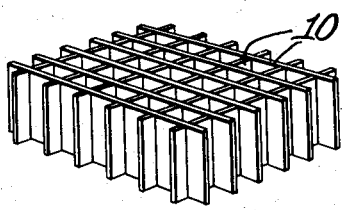
Figure 8 is a perspective view of a grid used for producing diced or strings by means of this apparatus.

Referring to the figures by characters of reference 1 designates a base which can be of any desired configuration and is adapted to rest on a table or other supporting structure. A standard 2 is secured to this base and can be of any desired cross section contour. In the structure shown it is made rectangular and has an angular sleeve 3 adjustably mounted on it, this sleeve being held against movement by a set screw 4 or the like. An adjustable plate 5 is carried by sleeve 3 and is formed, in the present instance, with a rectangular opening 6. To the bottom of this plate are attached flanges 7 extending outwardly from the upper edges of a box-like support 8 located under the plate and having narrow bottom flanges 9 extending inwardly from the bottom thereof. The supporting structure 8 is substantially flush with the walls of the opening 6 and the flanges 9 are adapted to support a grid of any desired construction. If it is desired to cut potatoes or other vegetables or fruits into strings which can be left long or can be cut transversely to form dice, a grid such as illustrated in Figures 4 and 8 would be used. This grid includes two series of parallel blades 10, the blades of each series being disposed transversely of the blades of the other series and the upper edges of all of the blades being located in the same plane. The ends of the blades project outwardly so as to engage the inner surfaces of the wall of supporting structure 8 while their lower corners rest on the inturned flanges 9. The blades are of such height that when they are thus supported, their upper edges will be up or below the level of the top surface of the plate.

Figure 9:
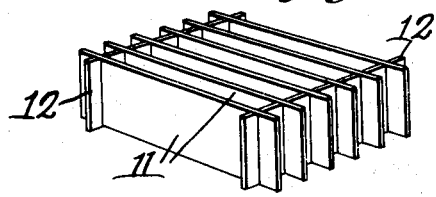

Should it be desired to cut potatoes or other vegetables or fruits into slices, a grid such as shown in Figure 9 would be used. This consists solely of a single set of parallel blades 11 connected near their ends by cross blades 12. This grid is also proportioned to fit snugly in the box-like support 8 depending from plate 5.

Adjustably mounted on the upper portion of the standard 2 is a sleeve 13 adapted to be held normally against movement by set screws 14 or the like. A gear housing 15 is carried by the sleeve 13 and has a removable side 16. In both sides of this housing is journaled a shaft 17 carrying a gear 18 and the shaft is adapted to be turned back and forth by a lever 19 secured to one end thereof.

A guide sleeve 20 is carried by the housing 15 and communicates therewith through a slot 21. Gear 18 extends into this slot where it can mesh with a rack 22 formed longitudinally upon a tubular plunger 23 preferably angular in cross section.

Downwardly diverging wings 24 are carried by the lower end of the plunger and are connected at their lower edges by a presser plate 25 having a plurality of apertures 26.

A slide 27 is mounted in the lower portion of the plunger and has diverging wings 28 extending downwardly therefrom between and close to the wings 24, and these wings are connected at their lower edges by an attaching plate 29 the side edges of which project laterally beyond the wings 28 to form flanges, as shown at 30.

A rod 31 is secured to and extended upwardly from the slide 27 within plunger 23 and its upper end is secured to a knob 32 or the like bearing on a tube 33 telescopically mounted on plunger 23 and yieldingly supported by a spring 34 the lower end of which is carried by a yoke 35 suspended within the plunger 23. Thus slide 27, rod 31, knob 32 and the other parts joined thereto are held normally elevated as shown in Fig. 1, the upper portions of the wings 28 bearing upwardly against corresponding portions of the wings 24. The plate 29 is adapted to be detachably engaged by an ejector one of which has been shown in Fig. 7. This device includes a plate 36 having inturned flanges 37 at the sides thereof and a finger piece 38 at its front edge.

This plate is adapted to be slipped onto the bottom surface of plate 29 so that flanges 37 will overlie and detachably engage the flanges 30. Depending from plate 36 are a number of pins 39 and these pins are so located that when the plate 36 is pushed downwardly, the pins will enter the openings provided between the blades and the grid thereunder. Obviously an ejector with any desired arrangement of pins can be used depending upon the arrangement of the blades with the grid and as the ejector is removable readily, devices of different types can readily be placed in position for the purposes of clearing material from the spaces between the blades as hereinafter explained. The openings 26 in the plate 25 are located where the pins 39 which can move downwardly within them.

Should it be desired for example to cut a potato into strings, a grid such as shown in Figures 4 and 8 would be used. This grid would be placed in the supporting structure 8 and an ejector with pins located so as to enter the different spaces between the blades of the grid, would be attached to the plate 29. After the parts thus have been assembled, the potato or the like to be cut is placed on the grid. Lever 19 is then actuated so as to cause gear 18 to force the plunger 23 downwardly.

Consequently the plate 25 will thrust against the potato or the like thereunder and force this downwardly against the upper edges of the blades of the grid so that the article thus will be divided into strings which will be projected downwardly from the grid. After the last potato or the like has thus been cut, and while the said plate 25 is in its lowermost position on the blade 5, the knob 32 can be pushed downwardly. This will cause the pins 39 to move through openings 26 and enter the spaces between the blades of the grid, thereby forcing out of those spaces any material left therein. As soon as pressure is removed from knob 32 the ejector and the plate 29 carrying it will return to normal position. The weight of lever 19 and its handle can be sufficient to slide the plunger and the parts thereon up to their normal position when released.

Obviously the strings produced in the manner herein described can be cut transversely to form dice. If it is desired to produce slices, the grid shown in Figure 9 can be substituted for the grid shown in Figure 8.

Figure 11:
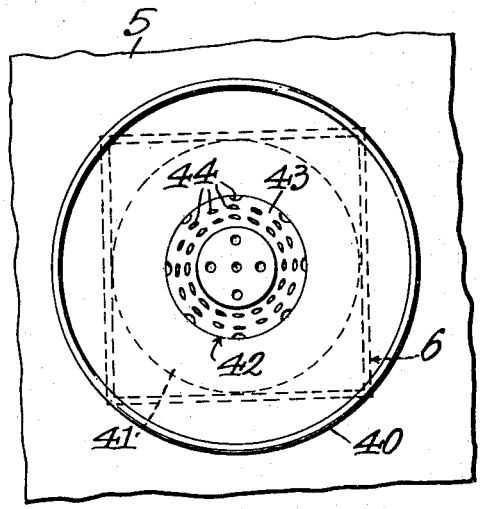
Figure 11 is a section on line 11—11 of Figure 10.
Figure 10:
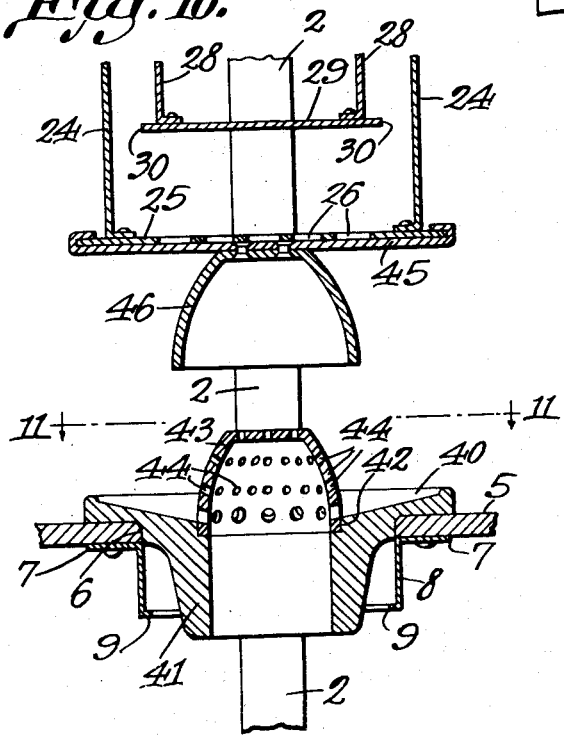
Figure 10 is a vertical section through a portion of the device equipped for extracting juices from fruits.
Figure 12:
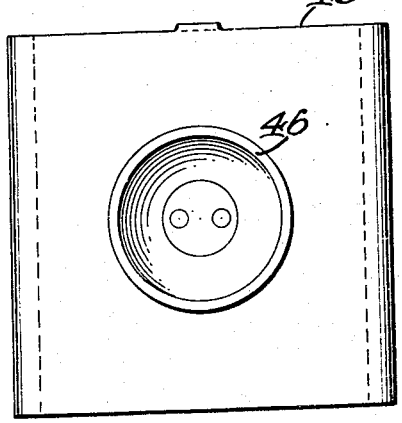
Figure 12 is a bottom plan view of the movable member of the fruit extractor.

If the device is to be used for the purpose of extracting juice from oranges, lemons, etc., a special attachment such as shown in Figures 10, 11 and 12 can be employed. Instead of providing a grid under these conditions, there is used a saucer 40 adapted to rest in the opening 6 and having a tubular depending portion 41. A recess 42 is provided at the center of the top of this saucer so as to constitute a seat for a substantially frusto-conical compressing member 43 which is hollow and has a plurality of apertures 44 in the walls thereof.

Instead of providing an ejector or thrust device such as shown in Figure 7, there is employed a thrust device consisting of a plate 45 similar to plate 36 and adapted to detachably engage plate 25. To the bottom of this plate 45 is secured an inverted cup 46 which, when properly located, overhangs the stationary compressing member 43.

To extract juice from a piece of fruit, said piece is placed between the members 43 and 46 and the plunger 23 is actuated so as to force plate 25 and parts thereon downwardly. Consequently the fruit will be compressed about the member 43 and the juice thus released will flow through the apertures 44 and downwardly through the tubular extension 41 into any container which may be provided therefor beneath the plate 5.

What is claimed is:

1. The combination with a supporting element for engagement with an article to be cut, and a guide located above said element, of a tubular plunger mounted for reciprocation in the guide, wings diverging downwardly therefrom, an apertured presser plate connecting the wings, a slide in the plunger, downwardly diverging wings thereon between the first named wings, a plate connecting the wings on the slide and providing side flanges, an ejector plate embracing said flanges and engaging the plate therebetween, ejector pins projecting from the ejector plate and movable within the presser plate, a yieldingly supported rod extending from the slide and within and above the plunger, and means on the rod for depressing the slide and the ejector relative to the presser plate.

2. The combination with a supporting element for engagement with an article to be acted upon, and a guide located above said element, of a plunger mounted for reciprocation in the guide, an apertured presser element connected to and spaced from the plunger, a slide carried by and movable relative to the plunger, oppositely extending flanges connected to the slide and positioned between the presser element and plunger, an element detachably engaging and supported by the flanges between the plunger and presser element, ejecting members extending from said flange-engaging element and movable through the apertures in the presser element and a yieldably supported device connected to the slide and projecting beyond the plunger, said device being depressible to produce relative movement of the said flange-engaging element with respect to the presser element.

CLEO LOVELACE.